No. 861,144. PATENTED JULY 23, 1907.
W. M. SCOTT.
APPARATUS FOR MOLDING BLOCKS.
APPLICATION FILED FEB. 11, 1907.
3 SHEETS—SHEET 1.
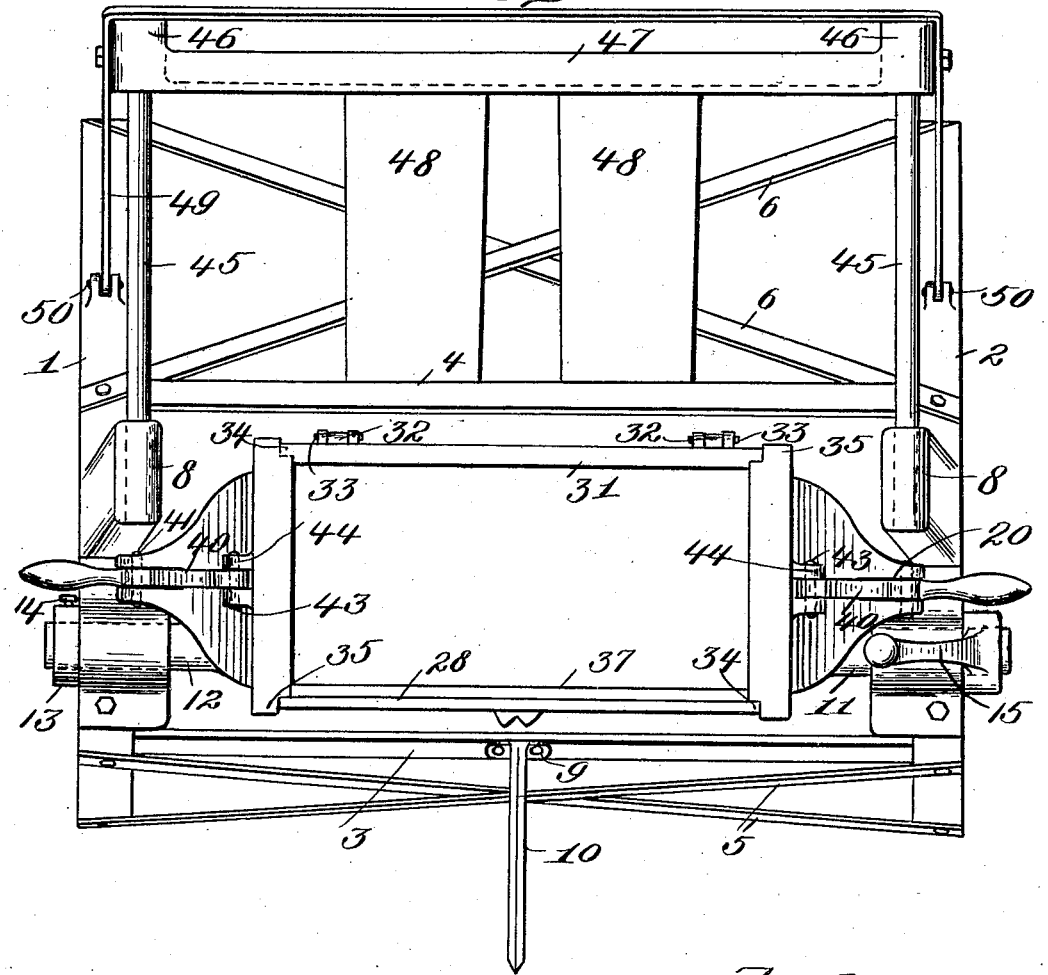
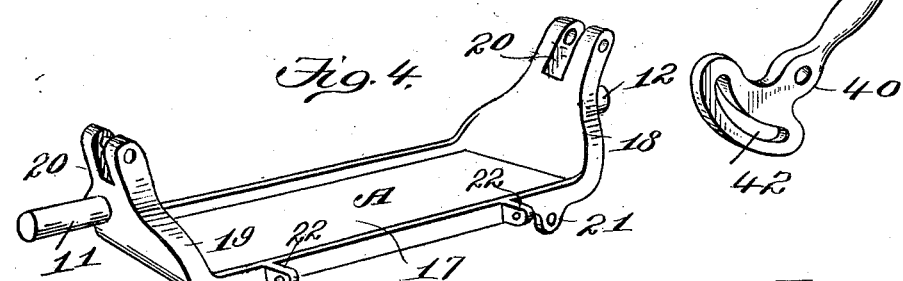
Witnesses:
C. J. Kesler
W. B. Keefe
Inventor
Wesley M. Scott
By
James L. Norris
Atty.

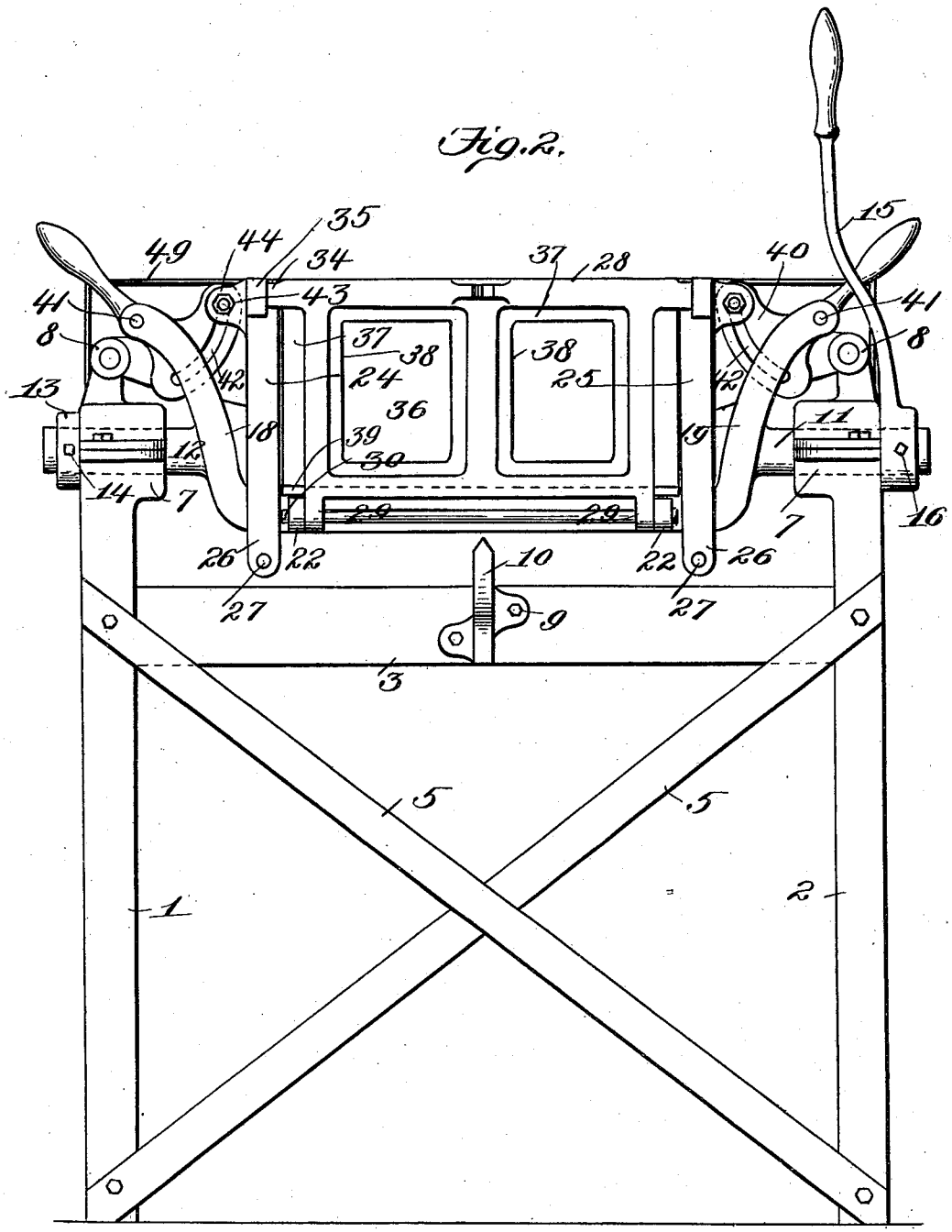

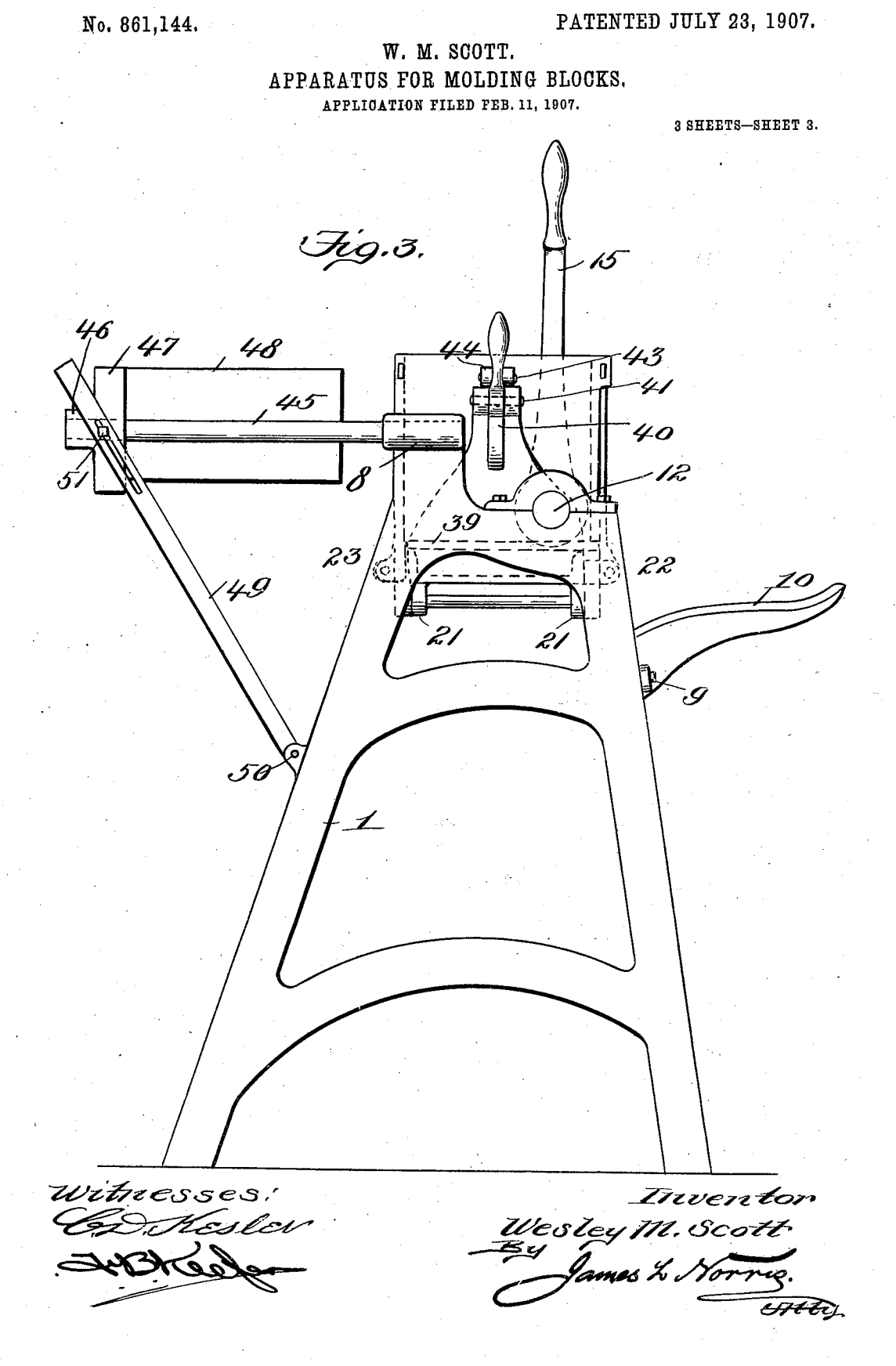

No. 861,144. PATENTED JULY 23, 1907.
W. M. SCOTT.
APPARATUS FOR MOLDING BLOCKS.
APPLICATION FILED FEB. 11, 1907.

3 SHEETS—SHEET 3.

Fig. 3.

Witnesses:
Inventor
Wesley M. Scott
By
James L. Norris.

UNITED STATES PATENT OFFICE.

WESLEY M. SCOTT, OF COLUMBUS, OHIO, ASSIGNOR TO THE HAYDEN AUTOMATIC BLOCK MACHINE COMPANY, OF COLUMBUS, OHIO, A CORPORATION OF OHIO.

APPARATUS FOR MOLDING BLOCKS.

No. 861,144.  Specification of Letters Patent.  Patented July 23, 1907.

Application filed February 11, 1907. Serial No. 356,797.

*To all whom it may concern:*

Be it known that I, WESLEY M. SCOTT, a citizen of the United States, residing at Columbus, in the county of Franklin and State of Ohio, have invented new and useful Improvements in Apparatus for Molding Blocks, of which the following is a specification.

This invention relates to an apparatus for molding hollow or solid blocks which may be formed of concrete or any other suitable material or a combination of materials, and said apparatus is especially adapted to mold what is known as concrete blocks, the body of which is formed of concrete, but the material employed in the construction of the blocks may be of any suitable character.

One of the objects of the invention is to construct an apparatus for the purpose set forth with means in a manner as hereinafter referred to whereby the molded article can be released from the mold and then automatically delivered to the free end of the apparatus, so that the article can be conveniently removed for curing.

A further object of the invention is to construct an apparatus for molding tiles or blocks which shall be simple in its construction, strong, durable, efficient in its use, conveniently operated, and comparatively inexpensive to set up.

With the foregoing and other objects in view, the invention consists in the novel construction, combination, and arrangement of parts hereinafter more specifically described and illustrated in the accompanying drawings, wherein is shown the preferred embodiment of the invention, but it is to be understood that changes, variations, and modifications can be resorted to which come within the scope of the claims hereunto appended.

In describing the invention in detail, reference is had to the accompanying drawings, wherein like reference characters denote corresponding parts throughout the several views, and in which Figure 1 is a top plan of a machine in accordance with this invention. Fig. 2 is a front view. Fig. 3 is an end view. Fig. 4 is a detail of a bottom section of the mold, and Fig. 5 is a detail of one of the slotted cam levers for locking and releasing the sides of the mold.

The machine comprises a supporting frame consisting of a pair of side sections 1, 2 connected together and braced by the longitudinally-extending members 3, 4 and further braced at the front end by a pair of cross-bars 5 and at the rear end by a pair of cross-bars 6. The top of each of the side sections 1, 2 is formed with a longitudinally-extending bearing 7 and a horizontally-extending sleeve 8, the bearing 7 being arranged at the front and the sleeve 8 at the rear of the section. The function of the bearing 7 and sleeve 8 will be hereinafter referred to. Projecting forwardly of the longitudinally-extending member 3 approximately centrally thereof, as well as being secured thereto, as at 9, is a support 10 for the front section of the mold when the tile or block is delivered from the mold.

Suspended within the supporting frame at the top thereof through the medium of the trunnions 11, 12, which are journaled in the bearings 7, is a sectional mold referred to generally by the reference character A. The trunnion 12 is retained in position in its bearing 7 through the medium of the collar 13 secured in position by the set-screw 14, while the trunnion 11 is retained in position in its bearing 7 through the medium of the lower end of the operating lever 15 which is fixed to the trunnion 11 by the set-screw 16. The lever 15 when shifted in one direction is adapted to impart a quarter turn to the mold A, and, when shifted in the opposite direction, is adapted to move the mold A back to normal position. When the mold A is shifted from normal position by moving the lever 15 in one direction, the front section is so positioned that, when the lever 15 is swung in an opposite direction, the said front section of the mold will be caused to project forward and slide upon the supporting member 10. This operation will be more apparent when the manner of setting up the mold is taken into consideration.

The mold A is formed of a bottom section 17 with the intermediate portion thereof flat and the end portions extending upwardly and outwardly at an inclination, as at 18, 19, and to the said end portions the trunnions 11, 12 are connected or formed integral therewith. Preferably, the trunnions form a part of the bottom section. The top of the end portions 18, 19 are bifurcated, as at 20, for the purpose to be hereinafter referred to. The flattened portion of the bottom section 17 at the front is formed with a pair of depending lugs 21 and at the rear a like pair of lugs 21 is provided. The front of the bottom section 17 is furthermore provided with a pair of forwardly-extending apertured lugs 22 and to the rear of the bottom section 17 a rearwardly-extending pair of lugs 23 is provided. Pivoted to the lugs 21 are the end sections 24, 25 of the mold, and for this purpose the end sections at their bottom are formed with extensions 26 which are pivotally connected to the lugs 21, as at 27. To the lugs 22 the front section 28 of the mold is pivoted, and for such purpose the section 28 is formed with projections 29 which are pivotally connected to the lugs 22, as at 30. To the lugs 23 is pivotally connected the rear section 31 of the mold and for such purpose projections 32 are provided which are pivotally connected to the lugs 23, as at 33. The rear, as well as the front section of the mold is formed with protuberances 34 adapted to take in the keepers 35 carried by the end sections so as to connect the front and rear sections to the end sections when the mold is closed. The front section as well as the rear section of the mold is formed with openings 36 to allow of the operation of the plungers to be hereinafter referred to. The mold further comprises a removable front section 37 having openings 38 corresponding to the openings 36 in the front section 28 and a removable face plate 39 which is mounted upon the bottom section 17. The upper face of the plate 39 is constructed of any suitable design so that the proper configuration will be given to the face of the molded article. The plate 39 is connected to the bottom section 17 in any suitable manner. In lieu of employing the removable face plate 39 the upper face of the bottom section 17 may be constructed in any suitable manner so that the proper configuration will be given to the face of the molded article.

The sections of the mold are locked in closing position as well as released from such position through the medium of a pair of combined locking and releasing slotted cam levers 40. The levers 40 are pivoted, as at 41, in the bifurcated ends 20 of the portions 18, 19 of the bottom section 17, and the said levers are provided with curved slots 42 through which extend pins 43. Projecting from each of the end sections of the mold A is a pair of lugs 44 to which a pin 43 is secured and between the pairs of lugs 44 the slotted portions of the levers 41 travel. From such an arrangement it will be evident that, when the levers 41 are shifted so as to elevate the slotted portions thereof, the walls of the curved slots 42 acting upon the pins 43 will draw the end sections of the mold from the front and rear sections thereof, and that, when the levers 41 are shifted so as to lower the slotted portions thereof, the end sections of the mold will be caused to close.

Projecting rearwardly from the top of the machine frame is a pair of supporting arms 45 which have their forward ends fixed to the sleeve 8 and their rear ends extending through collars 46 formed on the ends of the plunger support 47. To the support 47 is suitably secured a pair of reciprocatory plungers 48. These latter are reciprocated through the medium of a bail 49 pivotally secured at its lower end, as at 50, to the side sections 1 and 2 of the supporting frame and having a pin and slot connection, as at 51, with the support 47. From such construction it is evident that, when the bail 49 is moved in one direction, the plungers will be caused to enter the mold, and, when moved in the opposite direction, the plungers will be withdrawn from the mold.

The operation of the apparatus is as follows: It will be assumed that the mold is empty and in its vertical or inoperative position; material for forming the face portion of the tile or block is then placed within the mold; the plungers 45 are then moved into the mold through the operation of the bail 49. The plungers 45 when in such position extend horizontally of the bolt and through the openings in the front and rear mold sections; and the operation of the plungers 45 in the manner as stated compressed the material which forms the face portion of the tile or block. After the plungers 45 have been moved to the position mentioned, the mold is filled up with concrete or cement and such material is allowed to set; the bail 49 is then moved rearwardly and the plungers 45 are then withdrawn from the mold; the lever 15 is then grasped by the operator and shifted so as to move the mold to a horizontal position or, rather, give a quarter turn to the mold. After the mold has been moved to a horizontal position the levers 41 are shifted so as to draw the end sections of the mold free of the front and rear sections thereof. The lever 15 is then shifted to its normal position, which will cause the mold to assume a vertical position with the exception of the front section of the mold, which, when the lever 15 is moved in an opposite direction, will be caused to move forwardly carrying the molded article therewith, or, in other words, the sections 28 and 37 of the mold will be moved over the supporting member 10. The molded tile or article is then supported upon the removable section 37 and then can be transported to any place desired.

Although it is stated that the front and rear sections of the mold can be provided with openings to allow of the operation of the plungers, yet it will be evident that the openings can be dispensed with as well as the plungers, so that a solid tile or block can be molded by the apparatus. Owing to the manner in which the front and rear sections are connected to the bottom section it is evident that they can be easily detached and new ones substituted if desired, and the same is true with respect to the end sections.

Owing to the manner of setting up the apparatus it is evident that all the parts are detachably connected together so that the apparatus can be readily taken apart for transportation and again set up without any inconvenience.

What I claim is:

1. An apparatus for molding blocks comprising a sectional mold suspended for rotation and having the bottom section thereof formed with a pair of upwardly and outwardly extending end portions, means carried by each of the said portions and connected with the end sections of the mold for locking together and opening the sections of the mold, and means connected with the end sections of the mold for rotating it.

2. An apparatus for molding blocks comprising a sectional mold suspended for rotation and having the bottom section thereof formed with a pair of upwardly and outwardly extending end portions, slotted levers pivoted in said portions and connected to the end sections of the mold for locking and opening the sections of the mold, and means connected to the said portions for rotating the mold.

3. An apparatus for molding blocks comprising a sectional mold suspended for rotation and provided with a bottom section having a pair of upwardly and outwardly extending end portions projecting clear of the end sections of the mold, levers pivoted in said portions and provided with curved slots, pins carried by the end sections of the mold and adapted to extend through the slots of the levers, and means connected with said end portions for rotating the mold.

4. An apparatus for molding blocks comprising a sectional mold suspended for rotation and provided with a bottom section having a pair of upwardly and outwardly extending end portions projecting clear of the end sections of the mold, levers pivoted in said portions and provided with curved slots, pins carried by the end sections of the mold and adapted to extend through the slots of the levers, means connected with said end portions for rotating the mold, a pair of rearwardly extending supporting rods, a plunger support shiftable upon said rods, plungers carried by the support, and a pivoted means connected with said support for shifting it.

5. An apparatus for molding blocks comprising a sectional mold suspended for rotation and provided with a bottom section having upwardly and outwardly extending end portions and further provided with front, rear and end sections pivotally connected to the bottom section, said end sections provided with means for retaining the front and rear sections in closing position when said end sections are moved to such position, slotted levers carried by the upwardly extending portions of the bottom section and engaging with the end sections for locking and opening the sections of the mold, and means for rotating the mold.

6. An apparatus for molding blocks comprising a sectional mold suspended for rotation and provided with a front section adapted to support the molded tiles, a rotatable suspension means connected with the bottom section of the mold and adapted for operation in both directions to project forwardly the front section of the mold and discharge the tile from the mold, and means carried by the bottom section of the mold and permanently connected to the end sections of the mold for locking together and opening the sections of the mold.

7. In an apparatus for molding blocks a sectional mold suspended for rotation and comprising a bottom section, front, rear and end sections pivoted to the bottom, and slotted levers pivoted to the bottom section and permanently connected to the end sections for opening and closing the mold, said end sections provided with means for retaining the front and rear sections in closing position when the end sections are moved to such position.

8. In an apparatus for molding blocks a sectional mold suspended for rotation and comprising a bottom section, front, rear and end sections pivoted to the bottom, combined with pins carried by the end sections, and levers pivoted to the bottom section and permanently connected to the end sections by said pins, said levers provided with curved slots the walls of which are adapted to engage said pins for opening and closing the mold when the levers are shifted said end sections provided with means adapted to retain the front and rear sections in closing position when the end sections are moved to such position.

In testimony whereof I have hereunto set my hand in presence of two subscribing witnesses.

WESLEY M. SCOTT.

Witnesses:
  PERRY A. ROACH,
  C. L. BREWER.